Nov. 1, 1966

B. S. PAULSON ET AL 3,282,036

MECHANICAL BEAN PICKER

Filed March 5, 1964

INVENTORS
BERNARD S. PAULSON
BRUCE H. PAULSON
BY
Merchant, Merchant & Gould
ATTORNEYS INVENTORS
BERNARD S. PAULSON
BRUCE H. PAULSON
BY
Merchant, Merchant & Gould
ATTORNEYS

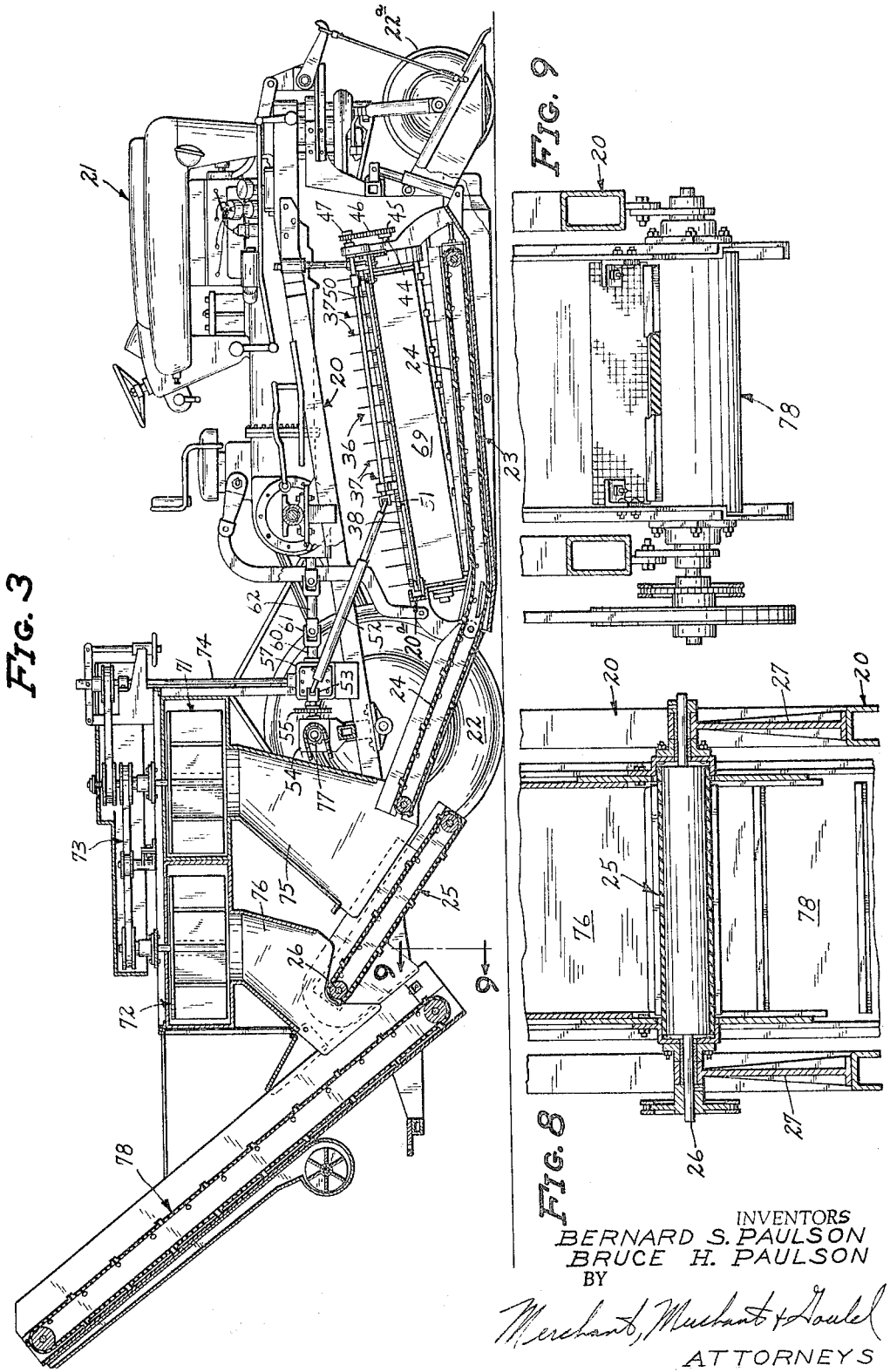

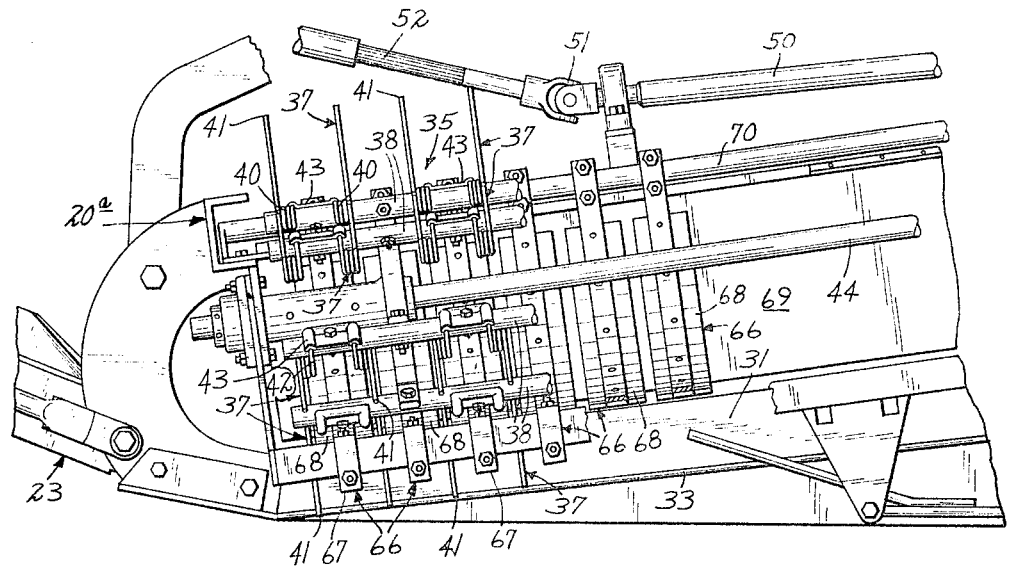
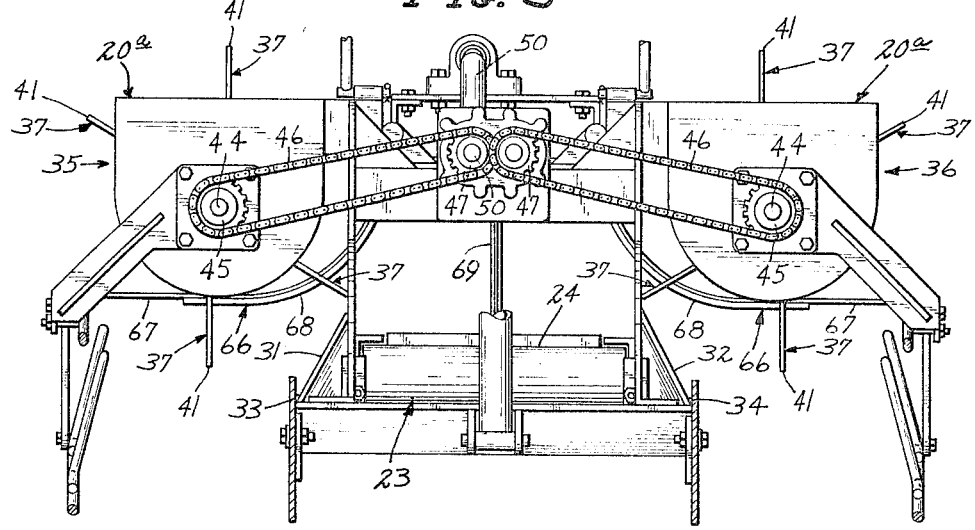

Nov. 1, 1966     B. S. PAULSON ET AL     3,282,036
MECHANICAL BEAN PICKER
Filed March 5, 1964     5 Sheets-Sheet 5
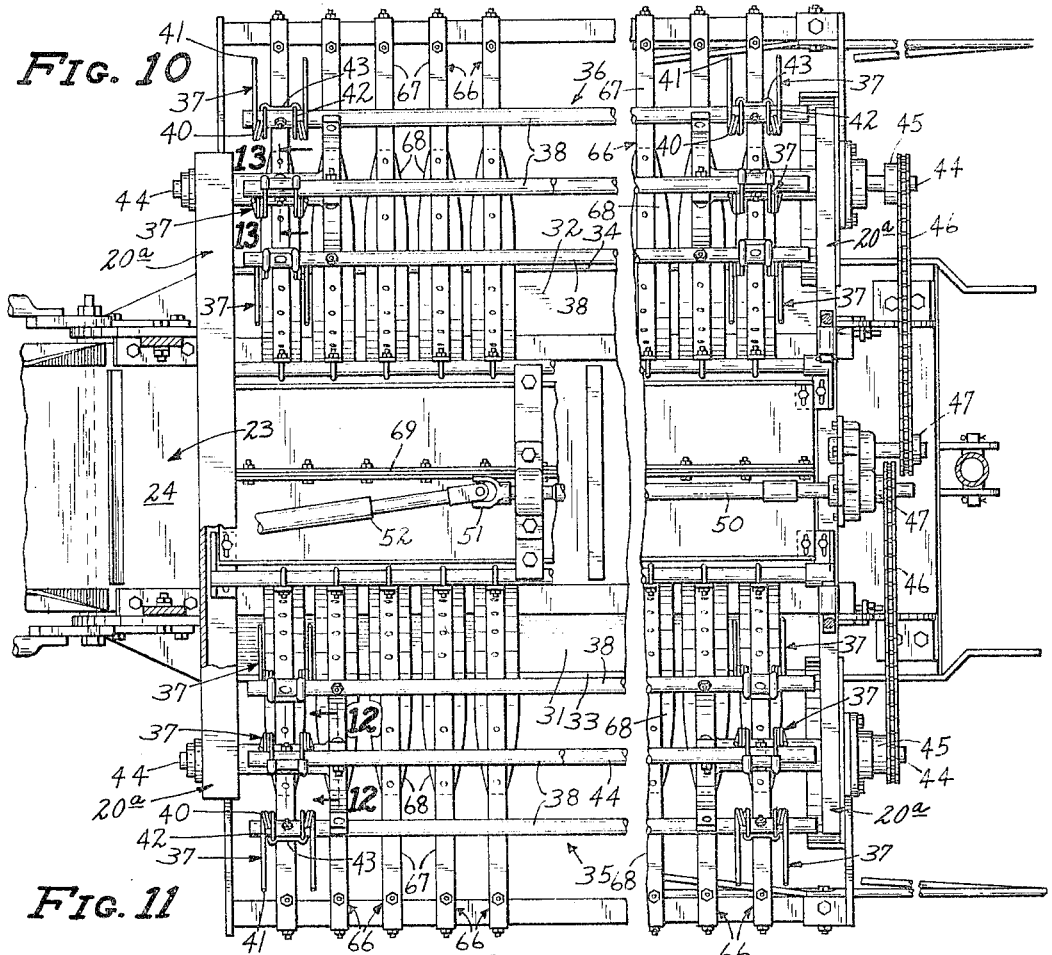
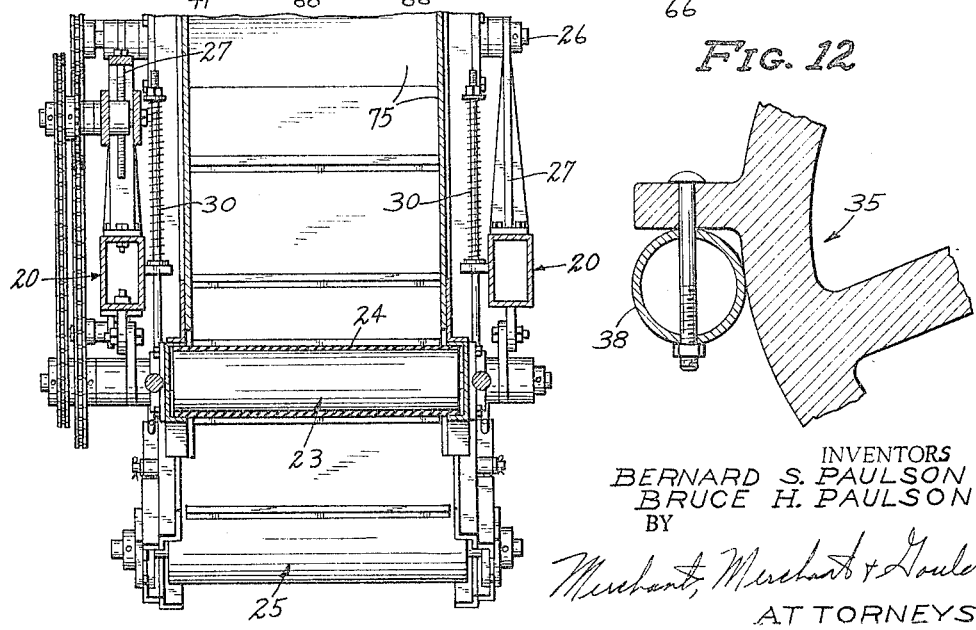
INVENTORS
BERNARD S. PAULSON
BRUCE H. PAULSON
BY
Merchant, Merchant & Gould
ATTORNEYS

United States Patent Office 3,282,036
Patented Nov. 1, 1966

3,282,036
MECHANICAL BEAN PICKER
Bernard S. Paulson and Bruce H. Paulson, both of Clayton, Wis., assignors, by mesne assignments, to Pixall Corporation, Clear Lake, Wis., a corporation of Wisconsin
Filed Mar. 5, 1964, Ser. No. 349,572
7 Claims. (Cl. 56—19)

This invention pertains to mechanical devices for harvesting crops, such as beans and the like, planted in rows, and more particularly pertains to improved stripper and conveying mechanisms for such mechanical devices.

The invention more particularly relates to mechanical bean pickers of the type wherein picker fingers, or tines, projecting radially outwardly from rotors which revolve on axes generally parallel to but laterally spaced from the row crop being harvested, pass upwardly through the plants during advancement of the picker and detach therefrom the harvested pods and deposite the pods on conveyors or the like for collection. Harvesters of this general character are old in the art, United States Patent No. 2,587,553 and Reissue No. 25,044 being typical.

Prior art bean pickers have disadvantages, however, in that during the harvesting process great amounts of debris, such as rocks and leaves, are gathered and mixed with the harvested crop. In addition, in many cases when the tines pass through the bean plant, the detached bean pods and parts of the plant will stick to the tines and a stripper mechanism is required to remove these pods from the tines. In prior art stripper mechanisms many of the bean pods were damaged during the stripping process.

In the present invention, on the other hand, arcuate stripping mechanisms having resilient edge portions are provided wherein the tines of the rotor work between the stripping mechanisms, the spacing between the resilient edge portions of adjacent stripping mechanisms being substantially equal, or slightly larger than the diameter of the tines.

The present invention also provides a multi-section conveyor system which transports the harvested crop from the picker rotors to a truck or other suitable collection device. The intermediate section of the multi-section conveyor system is inclined and is pivotally mounted at its top end, the bottom end of the intermediate conveyor section being spring-mounted. Any rocks, or heavy articles, intermixed with the harvested bean crop are unable to maintain traction on the inclined intermediate conveyor section and hence roll off the conveyor to the ground.

In addition, a fan mechanism is provided which moves air through the conveyed material as the conveyed material is transferred from the first conveyor section to the inclined intermediate conveyor section and this movement of air removes any dirt, leaves, or other light undesirable material intermixed with the harvested crop.

The present invention thereby provides means for removing a maximum amount of the debris intermixed with the harvested crop before the crop reaches the truck or other collection device.

It is one object of the present invention, therefore, to provide an improved mechanical bean picker.

A further object of this invention is to provide a mechanical bean picker having an improved stripping mechanism for removing the harvested crop from the gathering tines.

Another object of this invention is to provide a mechanical bean picker having an improved conveying system wherein most of the debris intermixed with the harvested crop is removed before the crop is collected.

These and other objects of our invention will become apparent to those skilled in the art upon consideration of the accompanying specification, claims and drawings.

Referring to the drawings, wherein like characters indicate like parts throughout the several views:

FIG. 3 is a view in longitudinal section as seen from a line 3—3 of FIG. 2, portions thereof being broken away;

FIG. 4 is an enlarged detailed view in elevation as seen from a line 4—4 of FIG. 2, parts being broken away and shown in section;

FIG. 5 is a view in vertical section as seen from a line 5—5 of FIG. 1, drawn on an enlarged scale;

FIG. 8 is an enlarged view in vertical section as seen from a line 8—8 of FIG. 1;

FIG. 9 is an enlarged view in vertical section as seen from a line 9—9 of FIG. 3;

FIG. 10 is an enlarged view in horizontal section as seen from a line 10—10 of FIG. 1, portions thereof being broken away;

FIG. 11 is an enlarged view in vertical section as seen from a line 11—11 of FIG. 1;

FIG. 12 is an enlarged detailed view in section as seen from a line 12—12 of FIG. 10.

Figure 1:
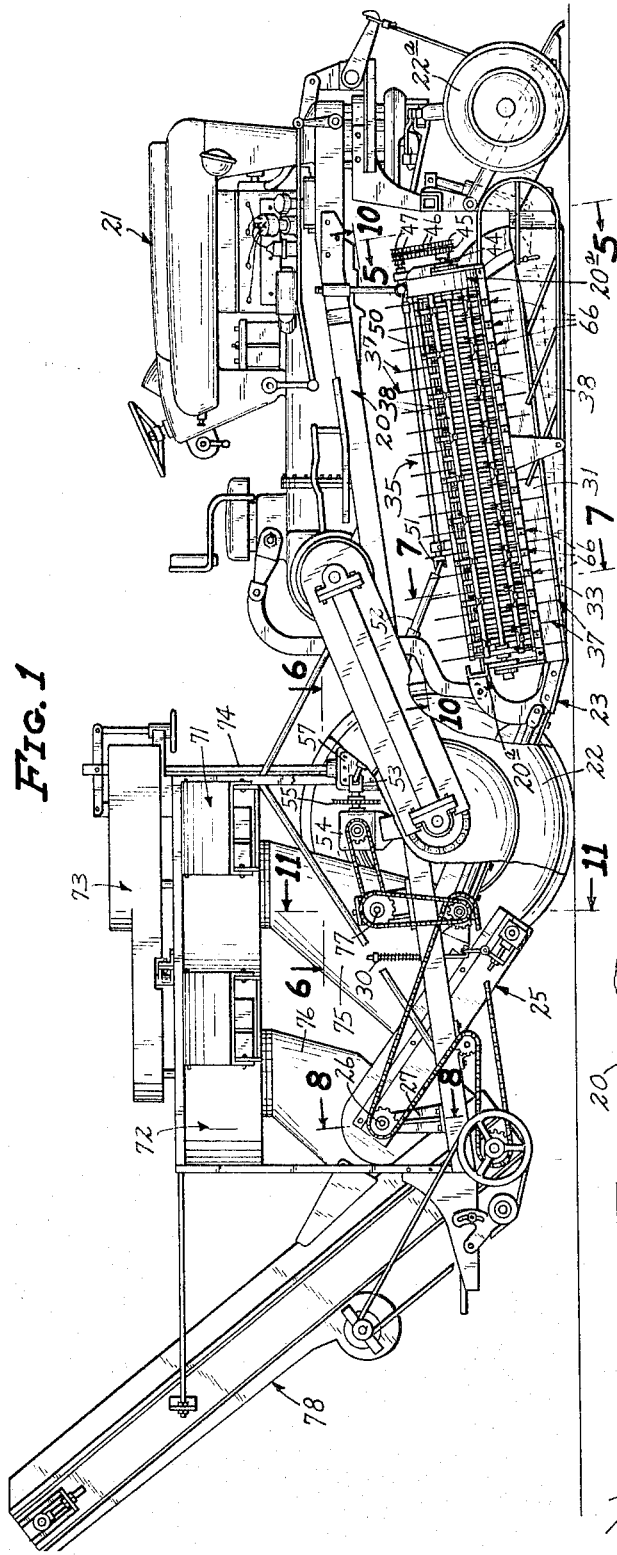
FIG. 1 is a side elevation of the present invention, parts thereof being broken away.
Figure 6:
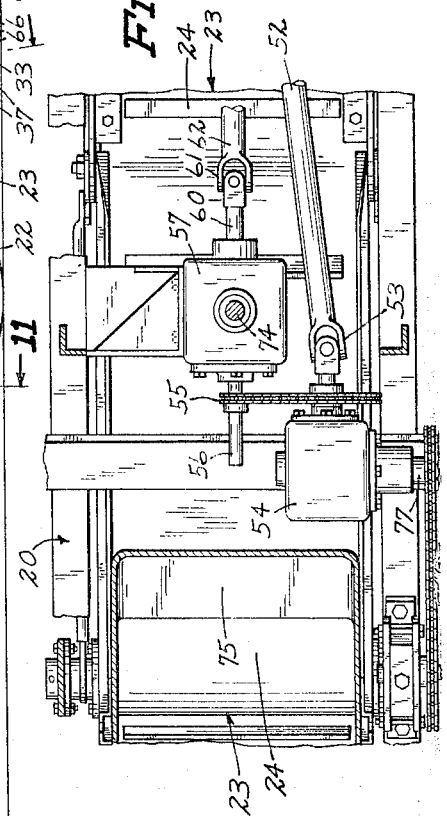
FIG. 6 is a view in horizontal section as seen from a line 6—6 of FIG. 1 drawn on an enlarged scale.
Figure 2:
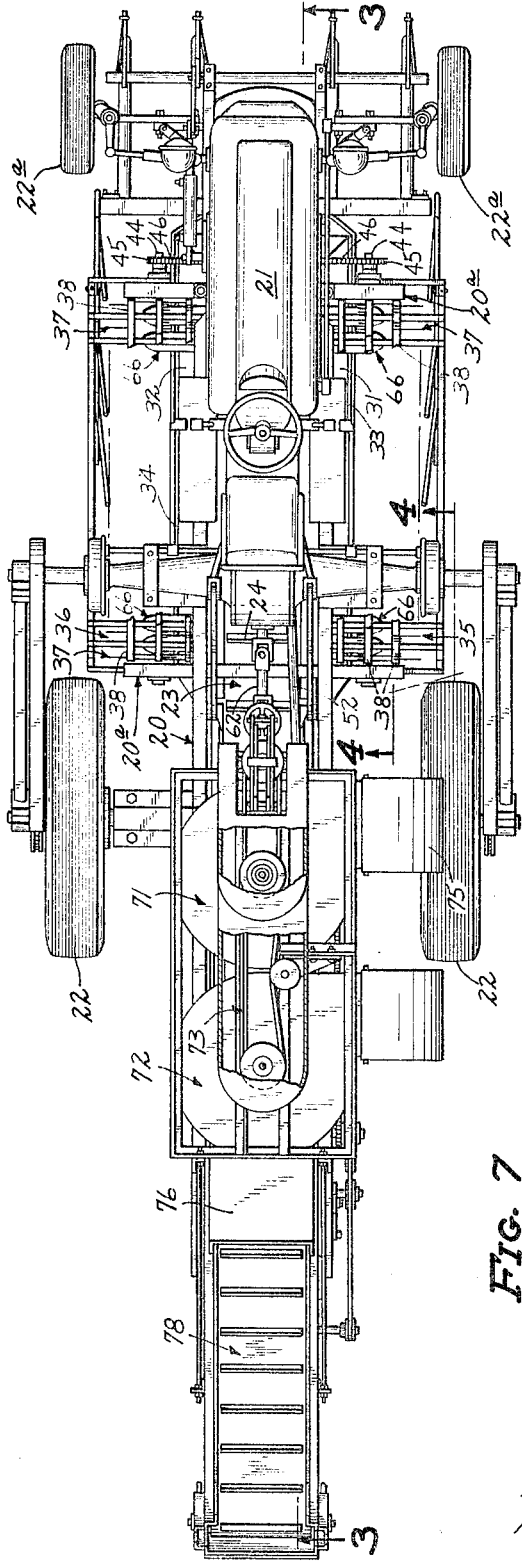
FIG. 2 is a view in top plan, portions thereof being broken away and shown in section.

Referring with greater particularity to the drawings, the numeral 20 indicates in its entirety an elongated frame having a tractor power mechanism 21 at its forward end. At its intermediate portion, the frame 20 is supported by a pair of laterally spaced wheels 22 and at its forward end by a pair of dirigible wheels 22a.

Secured to the front end portion of the frame 20, in closely spaced relation to the ground, is a generally horizontally displaced endless belt conveyor section 23, the upper delivery flight of which is identified by the numeral 24. A second endless belt conveyor 25 is generally longitudinally aligned with conveyor section 23, conveyor section 25 sloping upwardly and rearwardly of the direction of travel of frame 20. The upper end of conveyor section 25 is mounted on a shaft 26 which is pivotally supported at its opposite ends by means of support members 27 mounted on frame 20. The lower end of conveyor section 25 extends below and overlaps the rearward end of conveyor section 23, the lower end of conveyor section 25 being spring-supported by means of spring-loaded hangers 30 attached to frame 20. Mounted on the frame 20 on opposite sides of the horizontal conveyor 23 are elongated horizontally extended guide plates 31 and 32, the outer longitudinal edges 33 and 34 respectively of which are below the level of the delivery flight 24 of the conveyor 23. The guide plates 31 and 32 slope laterally outwardly and downwardly.

Figure 13:
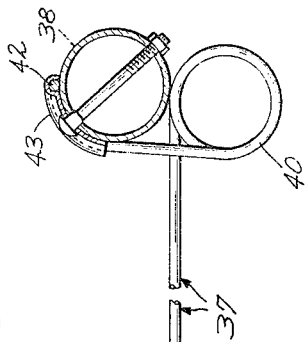
FIG. 13 is an enlarged detailed view in section as seen from a line 13—13 of FIG. 10.
Figure 7:
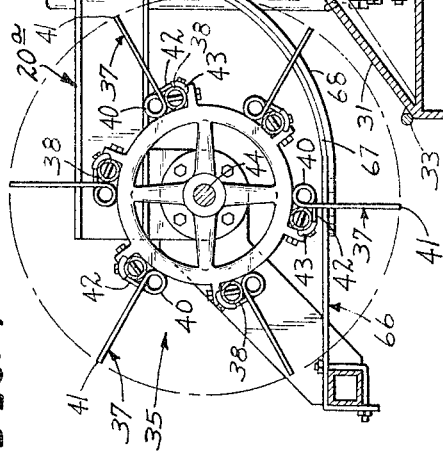
FIG. 7 is an enlarged view in vertical section as seen from a line 7—7 of FIG. 1, portions thereof being broken away.

A pair of gathering rotors, identified in their entireties by the numerals 35 and 36, are mounted for rotation in the frame 20 in laterally spaced parallel relation on axes extending generally longitudinally of the direction of travel of the frame 20, the axis of each rotor 35 and 36 being disposed laterally outwardly of the outer longitudinal edges 33 and 34 of the guide plates 31 and 32 respectively and considerably above the level of the guide plates 31 and 32. The rotors 35 and 36 include a plurality of circumferentially and longitudinally spaced radially extended resilient picker tines 37. The tines 37 are of conventional design and are adapted to be detachably secured to circumferentially spaced longitudinally extended bar-like mounting members 38 carried by rotors 35 and 36. As shown, particularly in FIG. 13, the tines 37 comprise coils 40 between their extended outer ends 41 and their inner ends 42. The inner ends 42 are clamped to the radially outer portions of the mounting members 38 by means of clamping plates 43.

The rotors 35 and 36 each include axles 44 to the forward ends of which are rigidly mounted gears 45, over which are entrained suitable flexible drive chains 46. The flexible chain drives 46 are likewise entrained over drive gears 47. The drive gear 47 is rotated by means of a shaft 50, the opposite end of which is connected by means of a universal joint 51 to a shaft 52, the opposite end of shaft 52 being connected by means of a universal joint 53 to an input shaft of a differential 54. The input shaft of differential 54 is driven by means of a chain drive 55 connected to an output shaft 56 of a differential 57. An input shaft 60 of differential 57 is connected by means of a universal joint 61 to a shaft 62, shaft 62 being driven by the internal combustion engine of tractor 21.

As the tractor 21 and frame 20 are driven between spaced rows of beans (not shown), the rotors 35 and 36 will be positioned laterally outwardly of but above the planes of an opposite row. Rotary movement, in the direction of the arrows of FIG. 5, is imparted to the rotors 35 and 36 simultaneously with forward movement being imparted to the frame 20. The picker mechanism moves down the rows of plants to be harvested, and the resilient picker tines 37 of the rotors 35 and 36 pass upwardly and inwardly through the plants of the adjacent rows, the action of the tines through the plants resulting in the stripping of the bean plants and causing the detached pods and foreign matter, such as leaves and parts of the bean plant, to be lifted or drawn upwardly into the delivery flight 24 of the conveyor section 23. Preferably, a vertically disposed longitudinally extended baffle 69 is provided to insure none of the picked bean pods will be thrown laterally off the opposite side of the delivery flight 24.

Since the tines 37 of the rotors 35 and 36 tend to strip the entire plant, in many cases the picked bean pods and portions of the bean plant itself will be entangled in a cluster and will stick or become entangled with the tines 37 of the rotors 35 and 36, and hence it is necessary to provide some type of stripper mechanism for removing these "clusters" from the tines. The resilient stripper fingers, indicated in their entirety by the numeral 66, are generally arcuate in shape and comprise a plurality of arcuate metal bands 67 mounted in laterally spaced apart parallel relationship, and secured by the upper end of the arc form is subframe 20a, which in turn is adjustably suspended from frame 20. A resilient strip 68, such as a rubber or plastic strip, is mounted in longitudinal alignment with metal band 67 and, rigidly attached thereto, strip 68 being substantially wider than metal band 67. It is preferable that the resilient strip 68, as seen from a cross-section of the width, be curved slightly downwardly. The upper portion of the arcuate stripper fingers is attached to a mounting bar 70 which in turn is attached to subframe 20a. The arcuate stripper fingers curve downwardly and outwardly beneath rotors 35 and 36 and are longitudinally spaced between each of the longitudinally spaced radial rows of resilient picker tines 37 so as to work therebetween. The spacing between adjacent resilient strips 68, bonded or attached to adjacent metal bands 67, is slightly larger than the diameter of the picker tines 37. In practice, the resilient picker tines 37 may be of approximately ¼ inch diameter, and hence, the spacing between the edges of adjacent resilient strips 68 would be approximately ¼ inch. An optimum spacing between adjacent resilient strips is from ¼ to ½ inch. As the spacing between the resilient fingers increases with respect to the diameter of the tines, the efficiency of the stripping action decreases.

As endless conveyor section 78 is mounted to frame 20 and is generally longitudinally aligned with conveyor section 25, conveyor section 78 sloping upwardly and rearwardly of the direction of travel of frame 20. The lower end of conveyor section 78 extends below and overlaps the upper end of conveyor section 25.

A first fan 71 and a second fan 72 are mounted above conveyor sections 23, 25 and 78 and are driven by a conventional pulley arrangement 73 connected to an output shaft 74 of differential 57. Fan 71 is connected to a duct arrangement 75 and operates to move a stream of air through the conveyed material as it is transferred from the end of conveyor section 23 onto conveyor section 25, while fan 72 operates through a duct arrangement 76 and operates to move a stream of air through the conveyed material as it is transferred from the upper end of conveyor section 25 onto conveyor section 78. The conveyor sections 23, 25 and 78 are driven by a conventional driving arrangement connected to an output shaft 77 of differential 54.

In operation, the bean picker is driven through the field so that the conveyor sections are drawn between spaced rows of beans (not shown), and the rotors 35 and 36 are positioned laterally outwardly of but above the planes of an opposite row. The rotary movement of the rotors cause the resilient picker tines 37 of the rotors 35 and 36 to pass upwardly and inwardly through the plants of the adjacent rows, the majority of the detached pods being lifted or drawn upwardly into the delivery flight 24 of the conveyor section 23. As will be noted, the rotors 35 and 36 are mounted so that the axes thereof tilt rearwardly and downwardly. With this arrangement the flexible tines 37 engages the bean pods from the tops of the vines or plants first, the tines working their way downwardly through the plants as the machine advances down the rows. If any of the beans, or part of the bean plants or other material sticks to the resilient tines of the rotors, this material will be removed from the tines by the operation of the stripper fingers 66.

As the rotors 35 and 36 turn and strip the bean pods from the plants, foreign material such as leaves from the plants and rocks will also be deposited on the delivery flight 24 of conveyor 23. All of this material, the bean pods plus the undesired debris, will be conveyed along the conveyor section 23 and then dumped, or transferred, from the end of conveyor section 23 onto conveyor section 25. Fan 71 causes a stream of air to move past the ends of conveyor section 23 and conveyor section 25 and as the conveyed material is transferred between conveyor section 23 and conveyor section 25, the light material, such as leaves and loose dirt, is sucked out of the conveyed material by the operation of fan 71 and is disposed of through an outlet on fan 71. Since conveyor section 25 is inclined, at an angle of approximately 35°, any heavy material, such as rocks, will roll off the lower end of conveyor section 25 and will fall back to the ground. The angle of inclination of conveyor section 25 is not sufficient to cause the bean pods to fall off the lower end of conveyor section 25. In addition, the lower end of conveyor section 25 is spring-mounted so that any heavy object falling on the conveyor will tend to increase the angle of inclination, and will further increase the separation between the end of conveyor section 23 and the lower end of conveyor section 25 so as to allow sufficient room for any large object to drop off of conveyor section 25. The remaining conveyed material is then transferred along conveyor section 25 and transferred from the upper end of conveyor section 25 onto conveyor section 78.

Fan 72, operating through fan duct 76, provides a stream of air through the conveyed material as it is transferred from conveyor section 25 onto conveyor section 78. The operation of fan 72 removes any additional light material, such as leaves or loose dirt, that may have been missed by fan 71 and deposits the same laterally through an outlet on fan 72. Conveyor section 78 is used as a loading conveyor and is used to load the harvested bean pods in a truck or other suitable collection device following conveyor section 78.

It is to be understood that while we have shown a specific embodiment of our invention, this is for the purpose of illustration only and that our invention is to be limited solely by the scope of the appended claims.

What is claimed is:

1. A mechanical picker for beans and the like planted in rows comprising:
   (a) a mobile frame;
   (b) a first endless conveyor generally horizontally disposed generally longitudinally of the direction of travel of said frame and having a delivery flight portion in closely spaced relation to the ground;
   (c) a pair of gathering rotors mounted for rotation in said frame in laterally spaced parallel relationship on axes extending generally longitudinally of the direction of travel of said frame, the axis of each rotor being disposed laterally outwardly of opposite longitudinal edges of said first conveyor, said rotors including a plurality of circumferentially and longitudinally spaced radially extended resilient picker tines, the outer ends of which are adapted to move upwardly and inwardly through the plants of adjacent rows to pick pods from said plants and carry the same toward the delivery flight of said first conveyor;
   (d) a pair of longitudinally extended rows of resilient stripper fingers carried by said frame, one each adjacent a different one of said rotors, the stripper fingers of each row having resilient edge portions, said stripper fingers being arcuate and having a curvature of arc substantially the same as that described by the extended ends of the tines, said fingers working between the tines of their respective rotors;
   (e) means for imparting rotation to said rotors; and
   (f) a second endless conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported.

2. A mechanical picker for beans and the like planted in rows comprising:
   (a) a mobile frame;
   (b) a first endless conveyor generally horizontally disposed generally longitudinally of the direction of travel of said frame and having a delivery flight portion in closely spaced relation to the ground;
   (c) a second endless conveyor generally longitudinally aligned with said first conveyor, said second conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported;
   (d) a third endless conveyor generally longitudinally aligned with said second conveyor, said third conveyor sloping upwardly and rearwardly of the direction of travel of said frame, the lower end of said third conveyor extending below and overlapping the upper end of said second conveyor;
   (e) a pair of gathering rotors mounted for rotation in said frame in laterally spaced parallel relationship on axes extending generally longitudinally of the direction of travel of said frame, the axis of each rotor being disposed laterally outwardly of opposite longitudinal edges of said first conveyor, said rotors including a plurality of circumferentially and longitudinally spaced radially extended resilient picker tines, the outer ends of which are adapted to move upwardly and inwardly through the plants of adjacent rows to pick pods from said plants and carry the same toward the delivery flight of said first conveyor;
   (f) a pair of longitudinally extended rows of resilient stripper fingers carried by said frame, one each adjacent a different one of said rotors, the stripper fingers of each row having resilient edge portions, said stripper fingers being arcuate and having a curvature of arc substantially the same as that described by the extended ends of the tines, said fingers working between the tines of their respective rotors;
   (g) a first fan mounted so as to move air through the conveyed material as the conveyed material is transferred from said first conveyor to said second conveyor; and
   (h) a second fan mounted so as to move air through the conveyed material as the conveyed material is transferred from said second conveyor to said third conveyor.

3. A mechanical picker for beans and the like planted in rows comprising:
   (a) a first conveyor generally horizontally disposed and having a delivery flight portion in closely spaced relation to the ground;
   (b) a second endless conveyor generally longitudinally aligned with said first conveyor, said second conveyor sloping upwardly and rearwardly from the rearward end of said first conveyor, the upper end of said second conveyor being pivotally mounted and the lower end of said second conveyor extending below and overlapping the rearward end of said first conveyor, the lower end of said second conveyor being spring-supported; and
   (c) a rotatably mounted gathering rotor having a plurality of circumferentially and longitudinally spaced radially extended resilient picker tines, the outer ends of which are adapted to move upwardly and inwardly through the plants to pick pods from said plants and carry the same toward the delivery flight of said first conveyor.

4. A mechanical picker for beans and the like planted in rows comprising:
   (a) a mobile frame;
   (b) a first endless conveyor generally horizontally disposed generally longitudinally of the direction of travel of said frame and having a delivery flight portion in closely spaced relation to the ground;
   (c) a gathering rotor mounted for rotation in said frame on an axis extending generally longitudinally of the direction of travel of said frame, the axis of said rotor being disposed laterally outwardly of a longitudinal edge of said first conveyor, said rotor including a plurality of circumferentially and longitudinally spaced radially extended resilient picker tines, the outer ends of which are adapted to move upwardly and inwardly through the plants of a row to pick pods from said plants and carry the same toward the delivery flight of said first conveyor;
   (d) a longitudinally extended row of resilient stripper fingers having resilient edge portions and being carried by said frame adjacent said rotor, the stripper fingers being arcuate and having a curvature of arc substantially the same as that described by the extended ends of the tines, said fingers working between the tines of said rotor;
   (e) means for imparting rotation to said rotor; and
   (f) a second endless conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported.

5. A mechanical picker for beans and the like planted in rows comprising:
 (a) a mobile frame;
 (b) a first endless conveyor generally horizontally disposed generally longitudinally of the direction of travel of said frame and having a delivery flight portion in closely spaced relation to the ground;
 (c) a second endless conveyor generally longitudinally aligned with said first conveyor, said second conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported;
 (d) a third endless conveyor generally longitudinally aligned with said second conveyor, said third conveyor sloping upwardly and rearwardly of the direction of travel of said frame, the lower end of said third conveyor extending below and overlapping the upper end of said second conveyor;
 (e) a gathering rotor mounted for rotation in said frame on an axis extending generally longitudinally of the direction of travel of said frame, the axis of said rotor being disposed laterally outwardly of a longitudinal edge of said first conveyor, said rotor including a plurality of circumferentially and longitudinally spaced radially extended resilient picker tines, the outer ends of which are adapted to move upwardly and inwardly through the plants of a row to pick pods from said plants and carry the same toward the delivery flight of said first conveyor;
 (f) a longitudinally extended row of resilient stripper fingers carried by said frame adjacent said rotor, the stripper fingers of said row being arcuate and having a curvature of arc substantially the same as that described by the extended ends of the tines, said fingers working between the tines of said rotor;
 (g) a first fan mounted so as to move air through the conveyed material as the conveyed material is transferred from said first conveyor to said second conveyor; and
 (h) a second fan mounted so as to move air through the conveyed material as the conveyed material is transferred from said second conveyor to said third conveyor.

6. A mechanical picker for beans and the like planted in rows comprising:
 (a) a mobile frame;
 (b) a first endless conveyor generally horizontally disposed generally longitudinally of the direction of travel of said frame and having a delivery flight portion in closely spaced relation to the ground;
 (c) a second endless conveyor generally longitudinally aligned with said first conveyor, said second conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported;
 (d) a third endless conveyor generally longitudinally aligned with said second conveyor, said third conveyor sloping upwardly and rearwardly of the direction of travel of said frame, the lower end of said third conveyor extending below and overlapping the upper end of said second conveyor;
 (e) a pair of gathering rotors mounted for rotation in said frame in laterally spaced parallel relationship on axes extending generally longitudinally of the direction of travel of said frame, the axis of each rotor being disposed laterally outwardly of opposite longitudinal edges of said first conveyor, said rotors including a plurality of circumferentially and longitudinally spaced radially extended resilient picker tines, the outer ends of which are adapted to move upwardly and inwardly through the plants of adjacent rows to pick pods from said plants and carry the same toward the delivery flight of said first conveyor;
 (f) a first fan mounted so as to move air through the conveyed material as the conveyed material is transferred from said first conveyor to said second conveyor; and
 (g) a second fan mounted so as to move air through the conveyed material as the conveyed material is transferred from said second conveyor to said third conveyor.

7. A mechanical picker for beans and the like planted in rows comprising:
 (a) a mobile frame;
 (b) a first endless conveyor generally horizontally disposed generally longitudinally of the direction of travel of said frame and having a delivery flight portion in closely spaced relation to the ground;
 (c) a second endless conveyor generally longitudinally aligned with said first conveyor, said second conveyor sloping upwardly and rearwardly of the direction of travel of said frame, the upper end of said second conveyor being pivotally mounted and the lower end of said second conveyor extending below and overlapping the rearward end of said first conveyor, the lower end of said second conveyor being spring-supported;
 (d) a third endless conveyor generally longitudinally aligned with said second conveyor, said third conveyor sloping upwardly and rearwardly of the direction of travel of said frame, the lower end of said third conveyor extending below and overlapping the upper end of said second conveyor;
 (e) a gathering rotor mounted for rotation in said frame on an axis extending generally longitudinally of the direction of travel of said frame, the axis of said rotor being disposed laterally outwardly of a longitudinal edge of said first conveyor, said rotor including a plurality of circumferentially and longitudinally spaced radially extended resilient picker tines, the outer ends of which are adapted to move upwardly and inwardly through the plants of a row to pick pods from said plants and carry the same toward the delivery flight of said first conveyor;
 (f) a longitudinally extended row of resilient stripper fingers having resilient edge portions carried by said frame, the resilient edge portions of adjacent stripper fingers being spaced approximately ¼ to ½ inch apart, the stripper fingers of said row being arcuate and having a curvature of arc substantially the same as that described by the extended ends of the tines, said fingers working between the tines of said rotor;
 (g) a first fan mounted so as to move air through the conveyed material as the conveyed material is transferred from said first conveyor to said second conveyor; and
 (h) a second fan mounted so as to move air through the conveyed material as the conveyed material is transferred from said second conveyor to said third conveyor.

References Cited by the Examiner

UNITED STATES PATENTS

| | | | |
|---|---|---|---|
| 2,675,663 | 4/1954 | Ward | 56—130 |
| 2,732,678 | 1/1956 | Blaser et al. | 56—364 |
| 3,021,662 | 2/1962 | Yaniuk | 56—364 |

ABRAHAM G. STONE, *Primary Examiner.*

ANTONIO F. GUIDA, *Examiner.*